United States Patent [19]

Fowell

[11] Patent Number: 5,738,309
[45] Date of Patent: Apr. 14, 1998

[54] SINGLE AXIS CORRECTION FOR ORBIT INCLINATION

[75] Inventor: Richard A. Fowell, Culver City, Calif.

[73] Assignee: Hughes Electronics, Los Angeles, Calif.

[21] Appl. No.: 608,238

[22] Filed: Feb. 28, 1996

[51] Int. Cl.$^6$ ............................. B64G 1/28; B64G 1/36
[52] U.S. Cl. ...................... 244/171; 244/165; 244/164; 342/355; 364/459
[58] Field of Search ................... 244/164, 165, 244/171; 342/354, 355, 357, 358; 364/459

[56] References Cited

U.S. PATENT DOCUMENTS

| | | | |
|---|---|---|---|
| 4,084,772 | 4/1978 | Muhlfelder | 244/165 |
| 4,294,420 | 10/1981 | Broquet | 244/165 |
| 4,776,540 | 10/1988 | Westerlund | 244/164 |
| 4,911,385 | 3/1990 | Agrawal | 244/165 |
| 5,062,592 | 11/1991 | Kishimito | 244/164 |
| 5,100,084 | 3/1992 | Rahn | 244/165 |
| 5,132,910 | 7/1992 | Scheit | 244/164 |
| 5,149,022 | 9/1992 | Flament | 244/164 |
| 5,184,790 | 2/1993 | Fowell | 244/165 |
| 5,257,760 | 11/1993 | Savoca | 244/164 |
| 5,437,420 | 8/1995 | Rosen | 244/165 |
| 5,443,231 | 8/1995 | Anzel | 244/164 |
| 5,476,239 | 12/1995 | Brainard | 244/171 |

FOREIGN PATENT DOCUMENTS

| | | | |
|---|---|---|---|
| 0199648 | 10/1986 | European Pat. Off. | 244/165 |
| 453096 | 10/1991 | European Pat. Off. | 244/165 |
| 88/00730 | 1/1988 | WIPO | 244/164 |

OTHER PUBLICATIONS

AIAA Guidance, Control and Flight Mechanics Conference, Hofstra University, Hempstead, NY, Aug. 1971, "A Twin Wheel Momentum Bias/Reaction Jet Spacecraft Control System," Dahl, pp. 1–11.

"Automatic Control in Space," vol. 1: Invited Papers, Renner, 1976, pp. 160–183, IFAC Symposium.

7th IFAC Symposium, "Automatic Control in Space," Broquet, May 1976, pp. 146–155.

"Inclined–Orbit Operation of Body–Stablized Satellites: A Practical Implementation Case," Haggag et al, AIAA–91–1985–CP, pp. 13281338 1992.

"GSTAR III Attitude for Inclined Geostationary Orbit," Parvez et al., 1990 American Institute of Aeronautics and Astronautics, Inc., AIAA–90–3493–CP, pp. 1615–1624.

*Primary Examiner*—Virna Lissi Mojica
*Attorney, Agent, or Firm*—Terje Gudmestad; Wanda K. Denson-Low; Elizabeth E. Leitereg

[57] ABSTRACT

A method and system of orienting a payload of an orbiting spacecraft (14) to maintain a desired pointing profile in the presence of orbit inclination. A cone (12) is determined which is traced in inertial space by a pitch axis of the payload to maintain the desired pointing profile throughout an orbit. A bias momentum vector of the spacecraft (14) is oriented at an attitude which lies along the cone (12). The attitude has a nonzero angle with respect to a plane spanned by an orbit normal vector and an equatorial normal vector. The payload is rotated about a single body-fixed axis perpendicular to the pitch axis to align the pitch axis along the cone (12). As a result, the desired pointing profile is maintained throughout the inclined orbit.

18 Claims, 3 Drawing Sheets

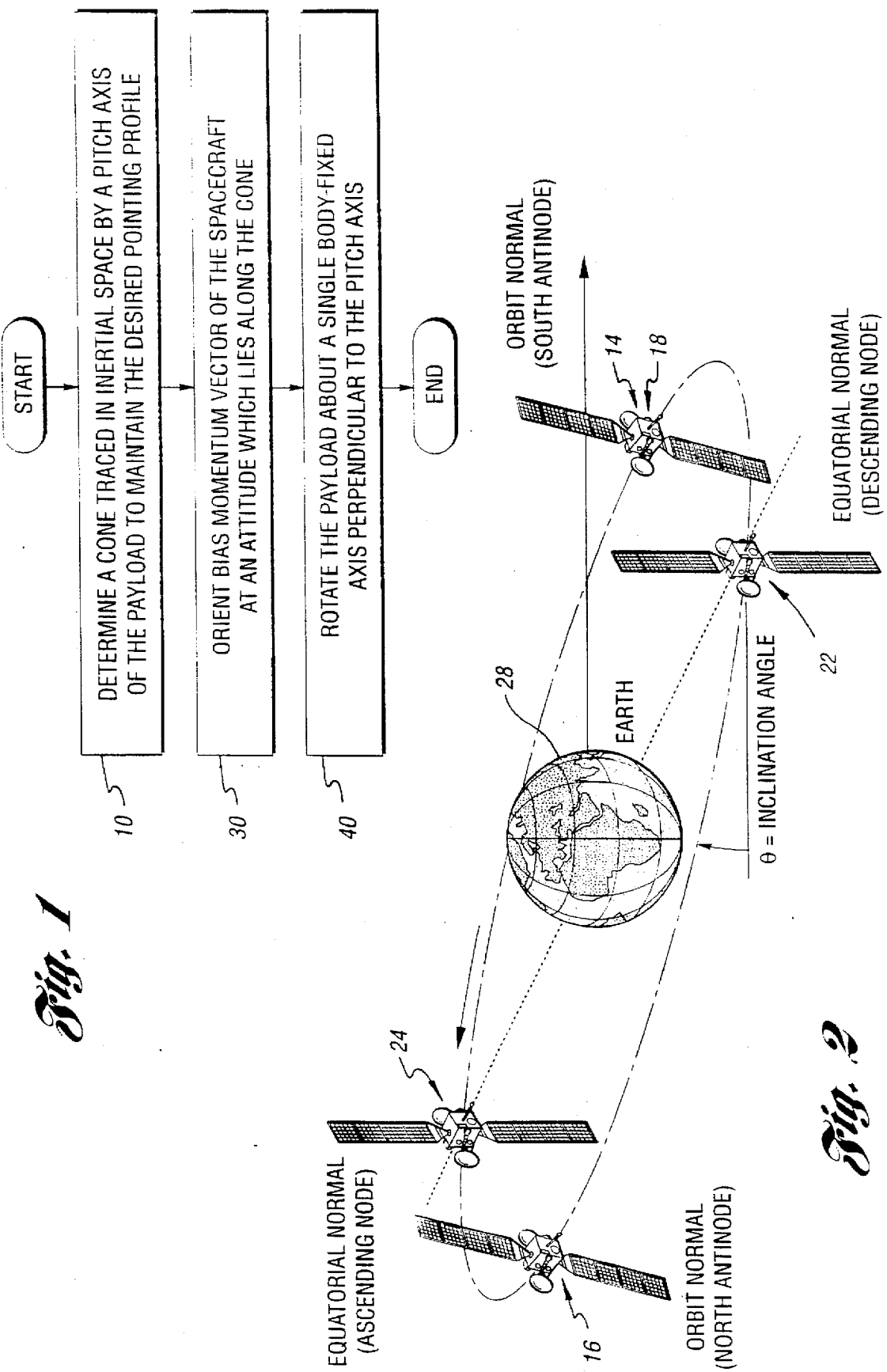

SINGLE AXIS CORRECTION FOR ORBIT INCLINATION

TECHNICAL FIELD

The present invention relates generally to maintaining a satellite in an orbit, and more particularly, to a method of operating a satellite in an earth orbit inclined to a nominal orbit.

BACKGROUND OF THE INVENTION

It is generally desirable to maintain certain types of satellites, such as communication satellites, in an orbit about the earth so that its location above a specific point on the earth remains fixed. This type of orbit is referred to as a geosynchronous orbit. A geosynchronous orbit enables a communication beam from the satellite to accurately cover a desired area on the surface of the earth. Any deviations from the geosynchronous orbit will alter the coverage of the beam.

To remain in a geosynchronous orbit, the satellite's nominal orbit is kept substantially within the equatorial plane of the earth. Further, the satellite itself is oriented perpendicular to this plane. Because of these requirements, the earth's geosynchronous orbit is crowded with a multitude of satellites. As a result, it is necessary to accurately maintain each of the satellites in a corresponding location in the equatorial plane.

A satellite placed in a geosynchronous orbit will experience deviations from the orbit due to certain effects such as gravitational forces from the sun and moon, and variations in the gravitational force of the earth due to its oblateness. These forces tend to move the satellite in both a north/south direction, i.e., above or below the equatorial plane, and an east/west direction, i.e., left or right on the orbital path. Excursions in the north/south direction tend to move the satellite out of the equatorial plane and into an inclined orbit. To an observer at a subsatellite location, the satellite appears to move in a "figure eight" pattern once per sidereal day due to the inclined orbit. It is usual to describe the satellite attitude in terms of an x, y, z coordinate frame, where z is directed from the satellite to the Earth center, y is directed opposite to the orbit angular velocity, and x completes a right-handed basis (approximately along the satellite velocity vector). The "x" axis is referred to as the "roll" axis, the "y" axis as the "pitch" axis, and the "z" axis as the "yaw" axis.

There are a number of existing schemes for correcting an inclined orbit. In "A Twin Wheel Momentum Bias/Reaction Jet Spacecraft Control System," AIAA Guidance, Control and Flight Mechanics Conference, 1971 by Dahl, a pair of identical momentum wheels are canted symmetrically away from the pitch axis in a plane containing the pitch axis. Dahl teaches that roll steering for orbit inclination-induced ground station pointing error corrections are cyclic at orbit frequency.

In "Attitude Control Requirements for Future Communications Satellites", 7th IFAC Symposium on Automatic Control in Space, 1976 by Renner, an angular momentum vector of the satellite is steerable with respect to the antenna boresight (or vice versa) about at least one axis, preferably the roll axis. This is done either by a single axis antenna pointing mechanism, a single gimballed momentum wheel, or a combination of fixed wheels. Control signals are generated to steer the angular momentum of the wheel.

In "Attitude Stabilization of Geostationary Satellite with a Single Degree of Freedom Angular Momentum Wheel System", op. cit., by Broquet, it is taught that when the orbit inclination on the equatorial plane is nonzero, a single degree of freedom system can operate an ideal satellite to point to the earth center regardless of the direction of the degree of freedom in the x-z satellite plane. For example, if the degree of freedom is along the roll axis, the angular momentum is maintained close to the north/south inertial direction. Similarly, if the degree of freedom is along the yaw axis, the angular momentum is maintained close to the inertial direction normal to the orbit plane.

In U.S. Pat. No. 4,084,772 to Muhlfelder, the angular momentum vector is placed along an equatorial normal, and the angular momentum is steerable with respect to the antenna boresight about the roll axis using two fixed wheels: a large wheel along the pitch axis, and a small wheel along the yaw axis. U.S. Pat. No. 4,294,420 to Broquet teaches steering the angular momentum with respect to the antenna boresight about the roll axis using two fixed wheels in the pitch-yaw plane, both generally at an angle to both pitch and yaw axes. U.S. Pat. No. 4,776,540 to Westerlund teaches the placement of the momentum vector at a calculated point slightly past orbit normal in order to eliminate roll error. However, yaw error is still present in this approach.

U.S. Pat. No. 4,911,385 to Agrawal teaches the same the placement of the momentum vector as Westerlund, however, with yaw error corrected using a gimbal. Agrawal also teaches placing the momentum vector in an orbit normal/equatorial normal plane, and correcting using roll and yaw gimballing means.

U.S. Pat. No. 5,100,084 to Rahn teaches that nonlinear effects of inclination can be corrected using offset pointing commands, and the use of an on-board model to automatically adjust the diurnal profile for the evolution of the orbit inclination. U.S. Pat. No. 5,184,790 to Fowell teaches a two-axis attitude correction for orbit inclination wherein the momentum vector is placed midway between orbit normal and Westerlund attitude to minimize radial roll/yaw correction.

The above-described schemes are disadvantageous in either not fully compensating for linearized errors, not correcting for pointing at points other than earth center, or requiring either two-axis angular momentum steering, or that the single axis steering be about either the roll or yaw axis.

SUMMARY OF THE INVENTION

It is an object of the present invention to provide a method and a system for correcting the pointing errors induced by an inclined orbit by rotating the pitch axis of the payload with respect to the spacecraft bias momentum about a single body fixed axis skewed in a roll-yaw plane, that is, an axis lying in the roll-yaw, or x-z plane, but substantially nonparallel to roll and yaw (x and z).

Another object of the present invention is to provide a method and a system for correcting an inclined orbit which fully compensates for linearized errors.

A further object of the present invention is to provide a method and a system for correcting an inclined orbit which does not require a roll gimbal, a yaw gimbal or a two-axis gimbal.

In carrying out the above objects, the present invention provides a method of orienting a payload of an orbiting spacecraft to maintain a desired pointing profile in the presence of orbit inclination. The method includes a step of determining a cone which is traced in inertial space by a pitch axis of the payload to maintain the desired pointing profile throughout an orbit. The method further includes a step of orienting a bias momentum vector of the spacecraft at an attitude which lies along the cone. The attitude is oriented so that the bias momentum vector does not lie in a plane spanned by an orbit normal vector and an equatorial normal vector. A step of rotating the payload away from the bias momentum vector about a single body-fixed axis perpendicular to the pitch axis, yet nonparallel to both roll and yaw axes is performed to align the pitch axis along the cone to maintain the desired pointing profile.

Further in carrying out the above objects, the present invention provides a system which performs the steps of the above-described method.

Embodiments of the present invention are advantageous in correcting the pointing errors induced by an inclined orbit using a single rotational degree of freedom actuator oriented perpendicular to the spacecraft pitch axis. If the earth-fixed point lies in the plane containing the subsatellite longitude arc, the present invention is advantageous in providing a correction which is exact to first order (i.e. correct in a linearized sense).

Embodiments of the present invention are further advantageous in that they do not require pure roll steering, pure yaw steering, or two-degree of freedom roll/yaw steering. These special cases, taught by the prior art for inclination pointing error correction, exclude single degree of freedom angular momentum wheel systems (such as taught in the Broquet paper), where the degree of freedom is neither about roll nor about yaw. The Dahl paper teaches how to build such systems using a pair of identical wheels that are not in the pitch-yaw or pitch-roll plane. By substituting other single degree of freedom systems, such as taught in the Broquet paper, or by using a payload gimbal whose axis is neither along roll nor yaw, many attitude control configurations are possible which can employ embodiments of the present invention to correct for inclined orbit errors.

These and other features, aspects, and advantages of the present invention will become better understood with regard to the following description, appended claims, and accompanying drawings.

BRIEF DESCRIPTION OF THE DRAWINGS

FIG. 1 is a flow chart of an embodiment of a method correcting for orbit inclination in accordance with the present invention;

FIG. 2 is an illustration of an inclined orbit of a spacecraft;

BEST MODE FOR CARRYING OUT THE INVENTION

Figure 3:
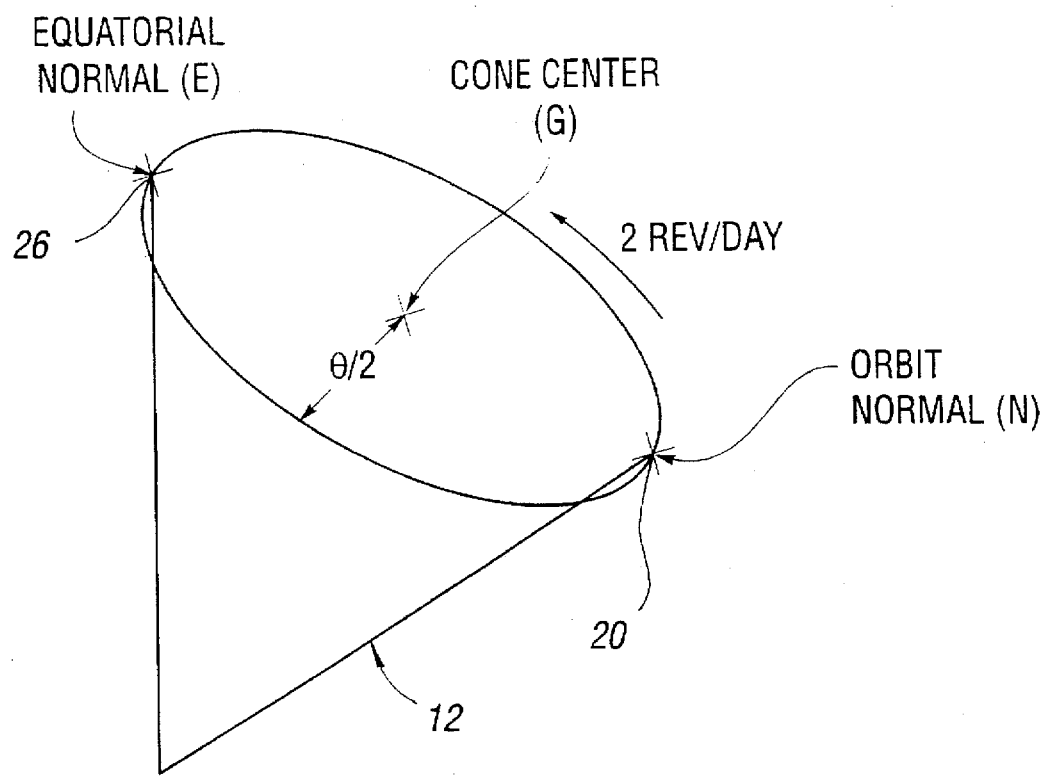
FIG. 3 is an illustration of a cone traced out in inertial space by a pitch axis of the payload in an inclined orbit; order to maintain a desired pointing profile throughout

Turning now to FIG. 1, there is shown a flow chart of a method of orienting a payload of an orbiting spacecraft to maintain a desired pointing profile in the presence of orbit inclination. As indicated by block 10, the method includes a step of determining a cone which is traced out in inertial space by a pitch axis of the payload to maintain the desired pointing profile through an orbit. This cone can be computed given knowledge of the spacecraft orbit, spacecraft payload and sensor geometry, and the desired pointing target. Orbit information is typically available from ground ranging data taken as a matter of course to support stationkeeping operations, as discussed in the Westerlund patent. FIG. 3 provides an illustration of this cone 12 for an inclined orbit of a spacecraft 14 shown in FIG. 2, when the desired spacecraft pointing is to the Earth center, such as would be indicated by an infrared Earth sensor. This is the case discussed by the Broquet paper. This prior art case will be discussed first, as it is simpler to describe, and has many features in common with the more useful case of pointing at a point fixed on the surface of the earth.

When the spacecraft 14 is at an orbit normal position, such as a North anti-node 16 or a South anti-node 18, the pitch axis is aligned along the cone 12 and oriented along an attitude 20. When the spacecraft 14 is located at an equatorial normal position, such as a descending node 22 or an ascending node 24, the pitch axis aligned along the cone 12 at an attitude 26. Consequently, the pitch axis of the payload traces around the cone 12 at twice the orbit frequency. Hence, for a spacecraft which orbits the Earth 28 at an orbit frequency of one orbit per day, the pitch axis sweeps around the cone 12 at two revolutions per day. It is further noted that for an inclination angle θ of the inclined orbit, the attitude of the pitch axis sweeps around the center of the cone 12 at an angle θ/2.

U.S. Pat. No. 5,184,790 to Fowell, which is hereby incorporated by reference, gives the nonlinear and the linearized equations for the correct payload pointing profile to point to an Earth-fixed reference point. From the linearized equations given in the Fowell patent, it is shown that if the inclination of the angular momentum is set to $$\frac{\rho(z+\rho)\Theta}{2L}$$

where θ is the inclination angle between the geosynchronous orbit and the inclined orbit, ρ is the orbit radius, z+ρ is the distance between the spacecraft and a fixed reference point projected on a line from the spacecraft to the center of the earth, and L is the square of the distance from the spacecraft to the fixed reference point, and the target point is in the plane of the nominal subsatellite longitude, then the roll-yaw corrections have equal amplitude in the body frame. Further, the roll-yaw corrections have a (-sine, cosine) relationship in the body frame. This means that the correct payload pitch attitude moves around the given inertial direction in a right circular cone of angular radius ρ(z+ρ) θ/2L. Since the pitch axis coning rate is in the same direction as the orbit rate in the body frame, the pitch axis coning rate is twice the orbit rate in the inertial frame.

Referring back to FIG. 1, a step of orienting a bias momentum vector of the spacecraft at an attitude which lies along the cone 12 is performed as indicated by block 30. In general, the attitude can have any alignment along the cone 12. Advantageously, the attitude can have a nonzero angle with respect to a plane spanned by the orbit normal vector 20 and the equatorial normal vector 26 shown in FIG. 3. As a result, .embodiments of the present invention are operative with a one-axis gimbal skewed in the roll-yaw plane. Consequently, the present invention can be utilized in a spacecraft which does not have a pure roll gimbal, or roll and yaw gimbals.

Figure 4:
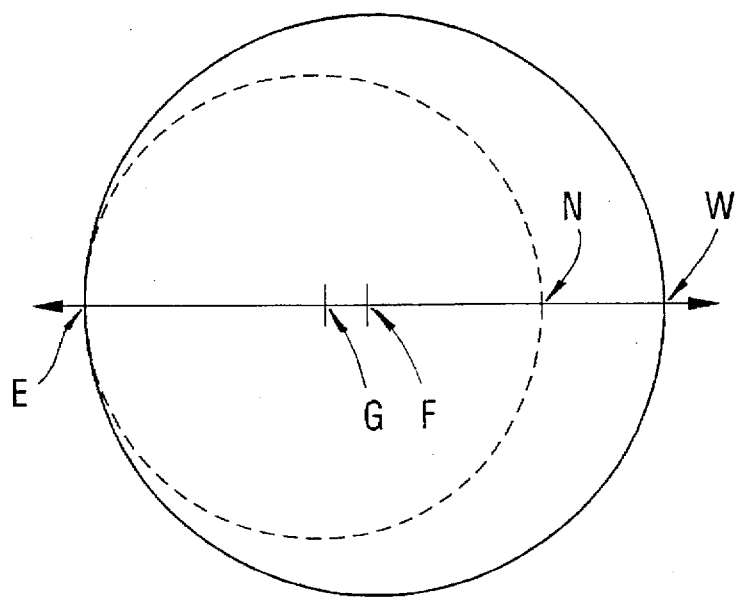
FIG. 4 shows the placement of the bias of the present invention and for prior art approaches; momentum vector with respect to the cone for embodiments

FIG. 4 provides an illustration of the location of the bias momentum vector with respect to the cone for embodiments of the present invention and for prior art approaches. When the earth-fixed point is in the plane of the nominal subsatellite longitude, and pointing with respect to that point is maintained identical to that maintained in a geosynchronous orbit, the path of the pitch axis of the payload in inertial space describes (to first order) a right circular cone spanned by the equatorial normal vector E and the attitude W taught in the Westerlund reference. The attitude W lies in the same plane as the equatorial normal vector E and the orbit normal vector N. The offset between the Westerlund attitude W and the orbit normal vector N is dependent on the specific location of the target point.

The attitude indicated by G is taught in the Fowell patent for pointing at earth center. The attitude indicated by F is the Fowell attitude for pointing at the nominal subsatellite point. It is noted that the attitude F is midway between the attitude W and the equatorial normal vector E.

When the target point is the nominal subsatellite point, the angle between W and E is approximately 1.178 times the angle between N and E. When the target point is the earth center, W and N are coincident.

The direction of the momentum bias vector as taught by the various prior art approaches can be summarized as follows. The Rennet article inferentially teaches the placement of the bias momentum vector at either attitude E or attitude N. The Broquet article explicitly teaches placement of the bias momentum vector at either attitude E or attitude N, and inferentially teaches the placement along the dashed circle in FIG. 4 which is spanned by E and N. The Muhlfelder patent teaches the direction of the bias momentum vector to be along the equatorial normal vector E. The Westerlund patent teaches the placement of the momentum bias vector along the attitude W. The Agrawal patent teaches the placement of the momentum vector along the solid vertical line shown in FIG. 4 at an attitude other than E. The attitude N is recommended for two axis correction, and the attitude W is recommended for yaw only. The Rahn patent teaches the momentum vector location along the attitude E. The Fowell patent teaches the location of the momentum vector along the solid vertical line of FIG. 4. The location along the solid vertical line is target dependent; the vector is located along the attitude G for an earth center target, while the vector is located along the attitude F for a nominal subsatellite target point.

In comparison to these prior approaches, embodiments of the present invention place the direction of the momentum bias vector along the solid circle illustrated in FIG. 4. This solid circle is indicative of a right circular cone spanned by the equatorial normal vector E and the Westerlund attitude W.

Referring back to FIG. 1, a step of rotating the payload about a single-body fixed axis perpendicular to the pitch axis is performed as indicated by block 40. This step is performed to align the pitch axis along the cone to maintain the desired pointing profile throughout the orbit. This step takes advantage of the fact that by placing the satellite angular momentum at any attitude along the cone traced out in inertial space, the body-fixed correction between that angular momentum vector and correct payload pitch axis is a rotation about a single, body-fixed axis perpendicular to the pitch axis for all pointing errors that are linear in the inclination angle.

The direction of this axis in the body is a function of which direction in the cone is selected. If only one correction axis is available in the body of the spacecraft, but any angular momentum direction is available, then an angular momentum direction can be found for use with a particular gimbal axis. If, on the other hand, several gimbal axes are available in the body, then the angular momentum vector direction can be chosen to best accommodate the momentum management system and/or to give the most acceptable pointing errors which result from a non-ideal momentum management system. Several gimbal axes are available, for example, if the payload has a two degree of freedom gimbal or the momentum storage device has two degree of freedom of transverse momentum storage.

A general scheme for finding the angular momentum direction given the axis is as follows. First, the payload is placed at some point in the orbit with the correct attitude for that point. Then, the payload is rotated about the gimbal axis until the payload axis passes through the cone again. This second direction is the appropriate inertial attitude for the angular momentum vector. If the payload pitch axis moves tangent to the cone, the appropriate attitude of the angular momentum vector is the current payload pitch axis attitude.

Figure 5:
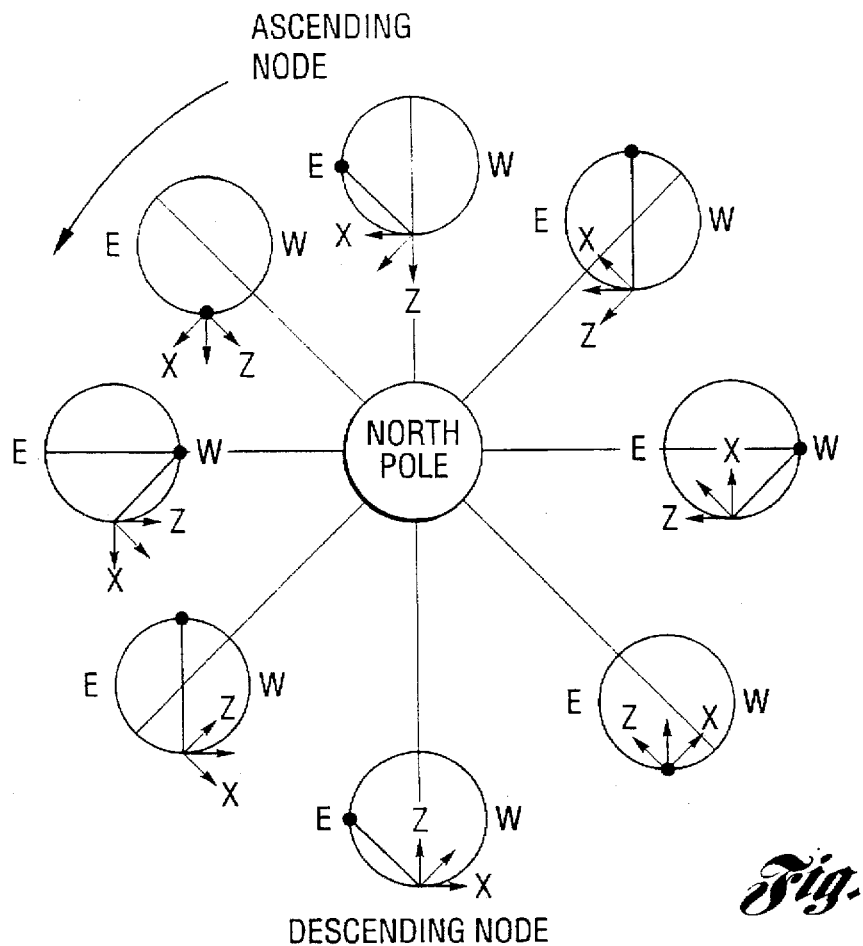
FIG. 5 illustrates eight snapshots of a spacecraft throughout an inclined orbit which utilizes a method of correcting the inclined orbit in accordance with the present invention.

FIG. 5 is an illustration of eight snapshots of a spacecraft having an inclined orbit which is corrected in accordance with embodiments of the present invention. These snapshots, which are viewed from North of the satellite, are taken at eight evenly spaced points in the orbit of the satellite. The Westerlund attitude, which shows the correct pitch axis attitude for anti-nodes, is indicated by W. The equatorial normal attitude, which is the correct payload pitch axis at the ascending and descending nodes, is indicated by E. The spacecraft roll and yaw axis, indicated by X and Z, respectively, are shown at each point.

The gimbal axis is shown as a short arrow at each of the points. In this example, the gimbal axis is illustrated at 45° between the roll axis X and the yaw axis Z. The black dot at each point in the orbit shows the proper payload pitch axis attitude for that point. It can be seen that the offset from the angular momentum vector, located at the intersection of Y and Z axis, and the pitch axis attitude is perpendicular to the gimbal axis in each case. It can also be seen that the inertial orientation of the angular momentum vector is held fixed throughout the orbit.

Figure 6:
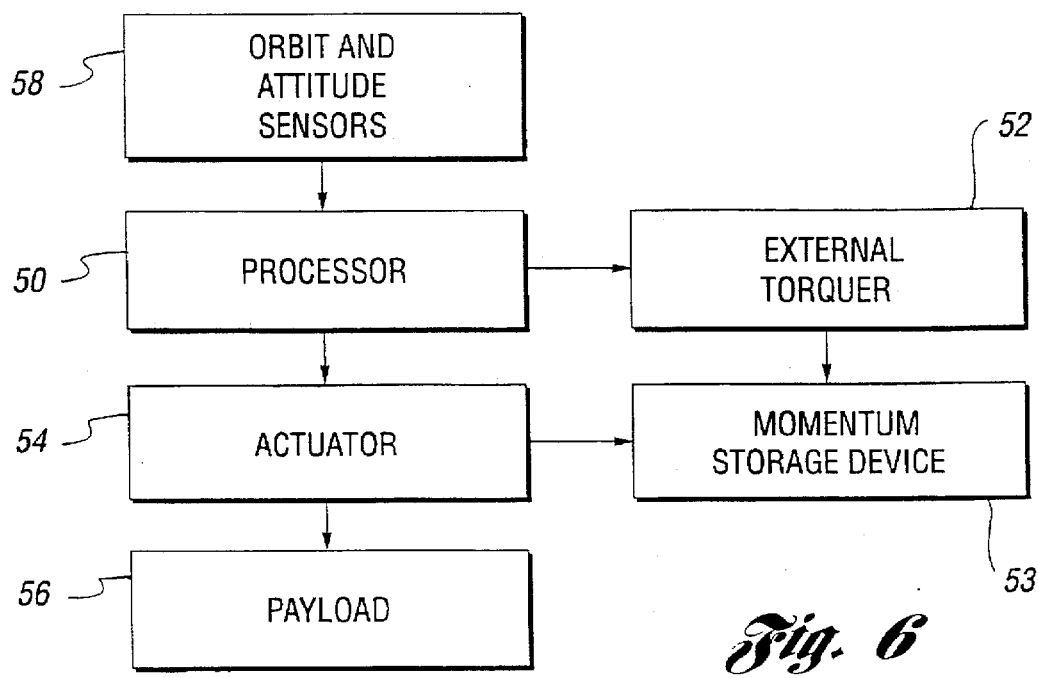
FIG. 6 is a block diagram of a system for correcting an inclined orbit.

FIG. 6 shows a block diagram of a system for correcting an inclined orbit in accordance with the present invention. Orbit and attitude sensors 58 determine the spacecraft orbit and attitude for input to a processor 50. In typical commercial practice, the orbit information is obtained by ground ranging sensors and telemetered to the spacecraft, while spacecraft attitude information is obtained from on-board sensors, such as earth or sun sensors, and on-board estimation using attitude dynamics models. Many means for orbit and attitude sensing, both on the ground and on the spacecraft are known in the art.

The processor 50 is used to determine the cone which is traced in inertial space by the pitch axis of the payload to maintain the desired pointing profile throughout an inclined orbit. An external torquer 52 (such as thrusters or magnetic torquers) is responsive to the processor 50 and momentum management logic to maintain the orientation of the spacecraft bias momentum vector at an attitude that lies along the cone, but outside of a plane spanned by the orbit normal vector and the equatorial normal vector. The attitude can have a nonzero angle with respect to a plane spanned by orbit normal vector and an equatorial normal vector. A momentum storage device 53 stores momentum produced by the external torquer 52.

A single degree of freedom actuator 54 is oriented along a body-fixed axis perpendicular to a pitch axis. The single degree of freedom actuator 54 is responsive to the processor 50 for rotating a payload 56 with respect to the momentum storage device 53 to align along the cone. As a result, the desired point profile is maintained throughout an inclined orbit.

The bias momentum vector produced by the momentum source 52 can be oriented using a one-axis gimbal skewed in a roll-yaw plane of the spacecraft. For example, the bias momentum vector can be oriented using a skewed-vee momentum wheel.

For an earth-sensor based system, once the desired bias momentum is set up, the gimbal angle can be controlled by the earth sensor roll error using a time-varying earth-sensor bias scheme. In this type of implementation, it is preferred that the gimbal axis be at least 30° from the yaw axis since for rotation purely about the yaw axis, the gimbal rotation will have no coupling into roll error. For beacon-sensing systems, the same preference against being too close to the yaw axis applies. However, since sensing is more accurate in the systems, the gimbal axis may be less than 30° from the yaw axis. If the beacon-site is the desired pointing location, then a time-varying sensor offset is not required.

In order to implement this system, it is assumed that a number of steps will be realized by means known to the art, or obvious to one skilled in the art. Specifically, means for determining the orbit of a satellite and predicting its evolution are discussed in the Westerlund patent, as are means for orienting the spacecraft bias momentum to a desired inertial attitude. Design and mechanization of attitude control systems using single degree of freedom actuators are taught in the Dahl paper, Broquet paper, Broquet patent and Rahn patent, as well as the papers cited therein. Note that in designing the control loops and momentum management system, the nonlinear equations of motion should be relinearized about the non-orbit normal momentum bias attitude and account for the skewed gimbal. Techniques for doing so are well-known in the art: the Rahn patent is (a special case of) the first step, and the Dahl paper is an example of the latter step. Similarly, the pointing kinematics are described in the Fowell '790 patent, and the exemplary equations there can be augmented for other effects, such as orbit eccentricity, deviation of orbit period from synchronous period, orbit evolution, and pointing profiles that are not fixed in the earth frame.

It is noted that the above described embodiments of the present invention can have various extensions thereto. Nonlinear effects can be considered for determining an appropriate correction axis and the location of the momentum bias vector. On-board models of orbit evolution can be used to update the offset profiles and change the targeted momentum bias direction used by on-board momentum management for increased autonomy. On-board estimation of errors in the instantaneous inertial angular momentum attitude can be factored into the sensor offset profiles. Sensor offset profiles could correct for other errors, such as orbit eccentricity, thermal distortion, earth oblateness, earth radiance variation, and external torque effects. Other sensors, such as sun sensors, star sensors and magnetometers could be used. Also, a cone can be determined for creating a best RF performance profile over an orbit rather than tracking a fixed point. Further, the gimbal can be located between the momentum source and the body, between the body and the payload, or a combination thereof. Still further, multiple degree of freedom gimbals can be used to provide a one degree of freedom motion. An advantage of this is that kinematic ambiguity can be eliminated and correction without offset profiles is allowed.

It is noted that the present invention may be used in a wide variety of different implementations encompassing many alternatives, modifications, and variations which are apparent to those with ordinary skill in the art. Accordingly, the present invention is intended to embrace all such alternatives, modifications and variations as fall within the spirit and broad scope of the appended claims.

What is claimed is:

1. A method of orienting a payload of an orbiting spacecraft including a bias momentum storage means to maintain a desired pointing profile other than at Earth center in a presence of orbit inclination, the method comprising the steps of:
   determining a cone which is traced in inertial space by a pitch axis of the payload in order to maintain the desired pointing profile throughout an orbit;
   orienting a bias momentum vector of the spacecraft at an attitude which lies in the cone and outside of a plane spanned by an orbit normal vector and an equatorial normal vector; and
   varying an angle between the payload pitch axis and the bias momentum vector about a single body-fixed axis skewed in a roll-yaw plane by an angle variation means to maintain the payload pitch axis in the desired pointing profile;
   wherein the attitude of the bias momentum vector and the single body-fixed axis are chosen to be consistent with maintaining the desired pointing profile.

2. The method of claim 1 wherein the bias momentum storage means includes a momentum wheel, and wherein the angle variation means includes a single axis gimbal.

3. The method of claim 1 wherein the angle variation means includes a single degree of freedom gimbal between the payload and a section of the spacecraft containing the bias momentum storage means.

4. The method of claim 1 wherein the angle variation means includes a first wheel and a second wheel whose axes are distinct and perpendicular to the single body fixed axis.

5. The method of claim 4 wherein each of the first wheel and the second wheel is selected from the group consisting of a momentum wheel and a reaction wheel.

6. The method of claim 1 wherein the bias momentum storage means includes a rotating, external section of the spacecraft.

7. The method of claim 1 wherein the bias momentum storage means includes a wheel selected from the group consisting of a momentum wheel and a reaction wheel.

8. The method of claim 1 further comprising the step of controlling the angle variation using a sensor selected from the group consisting of an infrared earth sensor, a radio-frequency beacon sensor, a ground-located radio-frequency beacon sensor, an optical beacon sensor, a magnetometer, a sun sensor, a star sensor, and a gyroscope.

9. The method of claim 1 wherein the payload is maintained to point fixed on a surface of the Earth.

10. A system for orienting a payload of an orbiting spacecraft including a bias momentum storage means to maintain a desired pointing profile other than at Earth center in a presence of orbit inclination, the system comprising:
    a set of orbit and attitude sensors to determine an orbit and an attitude of the spacecraft;
    a processor which determines a cone which is traced in inertial space by a pitch axis of the payload in order to maintain the desired pointing profile throughout the orbit;
    an external torquer responsive to the processor to maintain an orientation of a bias momentum vector of the spacecraft at an attitude which lies along the cone and lies outside a plane spanned by an orbit normal vector and an equatorial normal vector; and angle variation means responsive to the processor for varying an angle between the pitch axis and the bias momentum vector about a single body-fixed axis skewed in a roll-yaw plane to maintain the pitch axis in the desired pointing profile;

wherein the attitude of the bias momentum vector and the single body-fixed axis are chosen to be consistent with maintaining the desired pointing profile.

11. The system of claim 10 wherein the bias momentum storage means includes a momentum wheel, and wherein the angle variation means includes a single axis gimbal.

12. The system of claim 10 wherein the angle variation means includes a single degree of freedom gimbal between the payload and a section of the spacecraft containing the bias momentum storage means.

13. The system of claim 10 wherein the angle variation means includes a first wheel and a second wheel whose axes are distinct and perpendicular to the single body fixed axis.

14. The system of claim 3 wherein each of the first wheel and the second wheel is selected from the group consisting of a momentum wheel and a reaction wheel.

15. The system of claim 10 wherein the bias momentum storage means includes a rotating, external section of the spacecraft.

16. The system of claim 10 wherein the bias momentum storage means includes a wheel selected from the group consisting of a momentum wheel and a reaction wheel.

17. The system of claim 10 further comprising the step of controlling the angle variation using a sensor selected from the group consisting of an infrared earth sensor, a radio-frequency beacon sensor, a ground-located radio-frequency beacon sensor, an optical beacon sensor, a magnetometer, a sun sensor, a star sensor, and a gyroscope.

18. The system of claim 10 wherein the payload is maintained to point fixed on a surface of the Earth.

* * * * *